(12) United States Patent
Collins et al.

(10) Patent No.: US 11,498,253 B2
(45) Date of Patent: Nov. 15, 2022

(54) SYSTEMS AND APPROACHES FOR CONTROLLING AN INJECTION MOLDING MACHINE

(71) Applicant: IMFLUX INC., Hamilton, OH (US)

(72) Inventors: Bryler Collins, Milford, OH (US); Ethan David Stiefel, Mason, OH (US); Gene Michael Altonen, West Chester, OH (US); Brandon Michael Birchmeier, Morrow, OH (US); Brian Matthew Burns, Mason, OH (US)

(73) Assignee: IMFLUX INC., Hamilton, OH (US)

( * ) Notice: Subject to any disclaimer, the term of this patent is extended or adjusted under 35 U.S.C. 154(b) by 270 days.

(21) Appl. No.: 16/437,164

(22) Filed: Jun. 11, 2019

(65) Prior Publication Data

US 2019/0389112 A1 Dec. 26, 2019

Related U.S. Application Data

(60) Provisional application No. 62/688,491, filed on Jun. 22, 2018.

(51) Int. Cl.
*B29C 45/77* (2006.01)
*B29C 45/03* (2006.01)

(52) U.S. Cl.
CPC ............. *B29C 45/77* (2013.01); *B29C 45/03* (2013.01); *B29C 2945/76006* (2013.01);
(Continued)

(58) Field of Classification Search
CPC .. B29C 2945/7618; B29C 2945/76257; B29C 2945/76498; B29C 2945/76658;
(Continued)

(56) References Cited

U.S. PATENT DOCUMENTS 3,628,901 A * 12/1971 Paulson ................. B29C 45/77
425/149
4,208,176 A * 6/1980 Salerno ................. B29C 45/76
425/139
(Continued)

FOREIGN PATENT DOCUMENTS

AT 7473 U1 4/2005
DE 102007061775 A1 7/2009
(Continued)

OTHER PUBLICATIONS

Gmbh (AT 7473U1_Machine Translation (Year: 2005).*
(Continued)

*Primary Examiner* — Yunju Kim
(74) *Attorney, Agent, or Firm* — Marshall, Gerstein & Borun LLP (57) ABSTRACT

Systems and approaches for controlling an injection molding machine having a first configuration and a mold forming a mold cavity and being controlled according to an injection cycle include obtaining a pattern for a portion of an injection cycle of an injection molding machine having a second configuration and operating the injection molding machine having the first configuration to inject a molten material into the mold cavity. While operating the injection molding machine having the first configuration, the obtained pattern is used to control a portion of the injection cycle.

6 Claims, 7 Drawing Sheets

(52) U.S. Cl.
CPC ............... *B29C 2945/7618* (2013.01); *B29C 2945/76257* (2013.01); *B29C 2945/76498* (2013.01); *B29C 2945/76658* (2013.01)

(58) Field of Classification Search
CPC ....... B29C 45/03; B29C 45/76; B29C 45/766; B29C 45/77
See application file for complete search history.

(56) References Cited

U.S. PATENT DOCUMENTS

| | | | |
|---|---|---|---|
| 2008/0290541 A1* | 11/2008 | Baumann | B29C 45/2725 |
| | | | 264/40.6 |
| 2016/0082636 A1 | 3/2016 | Altonen et al. | |
| 2016/0250791 A1 | 9/2016 | Schiffers et al. | |
| 2017/0057146 A1 | 3/2017 | Altonen et al. | |
| 2017/0165887 A1* | 6/2017 | Burns | B29C 45/72 |
| 2017/0168471 A1 | 6/2017 | Burns et al. | |

FOREIGN PATENT DOCUMENTS

| | | |
|---|---|---|
| WO | WO-2016/100314 A2 | 6/2016 |
| WO | WO-2017/060270 A1 | 4/2017 |

OTHER PUBLICATIONS

Kuzma ("Plastic injection molding", Mar. 29, 2018, https://www.kuzmaindustrial.com/product/plastic-injection-molding/) (Year: 2018).*

International Search Report and Written Opinion for Application No. PCT/US2019/036461 dated Sep. 3, 2019.

Ishikawa et al., "Intelligente Regelung Von Vollelektrischen SG-Maschinen", Kunststoffberater, vol. 41, No. 12, pp. 16-21, Dec. 1, 1996.

International Search Report and Written Opinion, corresponding International Application No. PCT/US2019/036455, dated Sep. 2, 2019.

* cited by examiner

SYSTEMS AND APPROACHES FOR CONTROLLING AN INJECTION MOLDING MACHINE

CROSS REFERENCE TO RELATED APPLICATIONS

This application claims the benefit of U.S. Provisional Application No. 62/688,491, filed on Jun. 22, 2018, the entirety of which is herein expressly incorporated by reference.

FIELD OF THE DISCLOSURE

The present disclosure relates generally to injection molding and, more particularly, to approaches for controlling injection molding machines using specific pressure profiles.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. In an injection cycle, the molten material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding procedure generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

In these systems, a control system controls the injection molding process according to an injection cycle that defines a series of control values for the various components of the injection molding machine. For example, the injection cycle can be driven by a fixed and/or a variable melt pressure profile whereby the controller uses sensed pressures at a nozzle as the input for determining a driving force applied to the material. The injection cycle may also be controlled by a fixed or variable screw velocity profile whereby the control senses the velocity of the injection screw as input for determining the driving speed applied to the material.

Changes in molding conditions can significantly affect properties of the molten plastic material. As an example, material specification differences between resin batches and changes in environmental conditions (such as changes in ambient temperature or humidity) can raise or lower the viscosity of the molten plastic material. When viscosity of the molten plastic material changes, quality of the molded part may be impacted. For example, if the viscosity of the molten plastic material increases, the molded part may be "under-packed" or less dense, due to a higher required pressure, after filling, to achieve optimal part quality. Conversely, if the viscosity of the molten plastic material decreases, the molded part may experience flashing as the thinner molten plastic material is pressed into the seam of the mold cavity. Furthermore, recycled plastic material that is mixed with virgin material may impact the melt flow index (MFI) of the combined plastic material. Inconsistent mixing of the two materials may also create MFI variation between cycles.

Some conventional injection molding machines do not adjust the molding cycle to account for changes in viscosity, MFI, or other material properties. As a result, these injection molding machines may produce lower quality parts, which must be removed during quality-control inspections, thereby leading to operational inefficiencies. Moreover, as an injection molding run may include hundreds, if not thousands, of mold cycles, the environmental conditions of the injection molding machine are not constant across each mold cycle of the run. Thus, even if the mold cycle is adapted to account for the environmental factors at the onset of the run, the changing environmental conditions may still result in the production of lower quality parts during mold cycles executed later in the run.

Additionally, reliance on sensed melt pressure values may result in inconsistently molded parts. For example, in environments where the injection cycle is based on a fixed melt pressure set point curve, the injection cycle may not be capable of properly injecting materials having varying characteristics (e.g., regrind, biodegradable, and/or renewable materials). Additionally, while some systems may use an adjustable melt pressure set point curve, these systems are oftentimes incapable of maintaining material tolerances when material specifications (e.g., viscosity and part density) do change. As a result, these systems may produce inconsistently-dimensioned parts, thus further increasing operational inefficiencies. These issues are further realized in the conventional injection molding process of controlling by screw velocity to a transfer position, moving the cycle from injection to hold. For example, as viscosity decreases, the material is easier to move. The injection portion will move the material at the same velocity as the nominal process but will control to the same hold pressure causing a more dense part. Conversely, a higher viscosity material, after being filled at the nominal velocity, will create a less dense part, potentially under packing or creating a part out of dimensional specification.

Further, during the preparation and validation phase leading up to large-scale part production, a validation process must occur for each different molding system. In other words, for each stage between experimentation and actual large scale production of a molded part, existing systems require a lengthy validation and experimentation phase to properly identify ideal control values. Such a process is also required when modifying the system to accommodate different numbers of mold cavities (e.g., when progressing from molds having two cavities to four, eight, 16, 32, 64, 196 cavities, and so on). Each validation and experimentation phase can take up to six months and thereby can result in substantial downtime while increasing overall costs and requiring extensive resources that could otherwise be used in different systems.

SUMMARY

Embodiments within the scope of the present invention are directed to the control of injection molding machines to produce repeatably consistent parts by treating an ideal cavity pressure profile as a system input to control operation of an injection cycle. A prototype having suitable quality is obtained using a pilot tool, and parameters from this injection cycle are used for all subsequent injection cycles, thereby avoiding the need to perform time consuming revalidation processes. Systems and approaches for controlling an injection molding machine having a first configuration and a mold forming a mold cavity and being controlled according to an injection cycle include obtaining a pattern for a portion of an injection cycle of an injection molding machine having a second configuration and operating the injection molding machine having the first configuration to inject a molten material into the mold cavity. While operating the injection molding machine having the first configuration, the obtained pattern is used to control a portion of the injection cycle.

In these examples, obtaining a pattern includes obtaining a cavity pressure setpoint curve for the injection cycle of the injection molding machine having the second configuration. The injection molding machine having the first configuration is operated by measuring a cavity pressure value of the mold cavity during the mold cycle. Upon measuring a nominal cavity pressure value, a pattern recognition portion of the injection cycle that is at least partially dependent on the obtained pattern commences. A driving force being exerted on the molten material is adjusted such that the measured cavity pressure matches the obtained pattern for the injection cycle.

In some forms, the injection molding machine having the first configuration includes a first number of mold cavities. The injection molding machine having the second configuration includes a second number of mold cavities that is different than the first number of mold cavities. In some forms, the injection molding machine having the first configuration is a first injection molding machine, and the injection molding machine having the second configuration is a second, distinct injection molding machine. The injection molding machine having the second configuration may be a pilot tooling.

The injection cycle may include first and second portions. The first portion of the injection cycle may be at least partially controlled by a melt pressure profile, and the second portion may be at least partially controlled by the obtained pattern. The obtained pattern may be indicative of an optimal pressure trace for a particular mold.

Any number of drive mechanisms may be used to apply a pressure to the molten material. For example, an electric press, servo-hydraulic press, full hydraulic, or any other type of press may be used. In some examples, the melt pressure control based input may be received via a nozzle melt pressure transducer. The cavity pressure measurements may be obtained via a cavity pressure transducer located in or near the cavity.

In accordance with another aspect, an injection molding machine may include a first injection unit having a mold forming a mold cavity, a controller adapted to control operation of the injection molding machine according to an injection cycle, and first and second sensors (e.g., pressure sensors) coupled to the injection molding machine and the controller. The first injection unit is adapted to receive and inject a molten plastic material into the mold cavity to form a molded part. The injection cycle includes a first portion and a second portion, wherein during the first portion, the controller controls the injection unit at least partially based on measurements obtained from the first sensor. Upon an event occurring, the second portion of the injection cycle commences whereby the controller further controls the injection unit at least partially based on measurements obtained from the second sensor. The second portion of the injection cycle operates according to a previously obtained pattern derived from a second injection unit.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale. For example, the dimensions and/or relative positioning of some of the elements in the figures may be exaggerated relative to other elements to help to improve understanding of various embodiments of the present invention.

DETAILED DESCRIPTION

Generally speaking, aspects of the present disclosure include systems and approaches for controlling an injection molding machine where an operational pattern (e.g., an operational curve) is obtained for a first injection unit and/or machine and used to at least partially control operation of any number of additional injection units and/or machines. In these systems and approaches, the injection cycle of the other injection units and/or machines is at least partially dependent on a desired operational pattern (i.e., in a closed loop manner) that is indicative of high quality parts that remain within desired dimensional tolerances. Accordingly, the system can adjust operational parameters of the injection process as needed in order for the output of the system to match that of the operational pattern. As used herein, the phrase "commencing a pattern recognition portion of the injection cycle" means a controller commences the operations that cause the injection molding machine to operate in a manner that are dependent on the obtained operational pattern or profile.

In some examples, the operational pattern may be in the form of an operational curve that can be identified during the validation or pilot phase of development where a prototype or pilot tooling is used. One such example of a suitable operational curve is a cavity pressure curve. As will be discussed in further detail below, the system may adjust operational parameters of the injection molding machine in order for its output to match that of the previously identified cavity pressure curve derived from the original machine used for validation and/or prototyping purposes.

So configured, once a prototype is obtained that has desired physical characteristics (e.g., a structurally sound molded prototype) using the first machine, injection parameters derived from the validation or qualification process may be subsequently used in injection cycles for different machines, thereby eliminating the need to undergo revalidation and/or qualification. Accordingly, revalidation costs may be substantially reduced and operational efficiencies may be greatly increased, as these resource-intensive processes are no longer needed. As a result, molded parts may be brought to the market much more quickly as compared to conventional approaches.

The described systems and approaches require a pattern to first be obtained from an injection molding machine that can be used to drive the injection cycles of other injection molding machines. Accordingly, the process for obtaining the pattern will first be described. Once this ideal pattern is obtained, it may be replicated on any injection machine having the same or nearly the same mold cavity as the mold cavity of the original machine.

Figure 1:
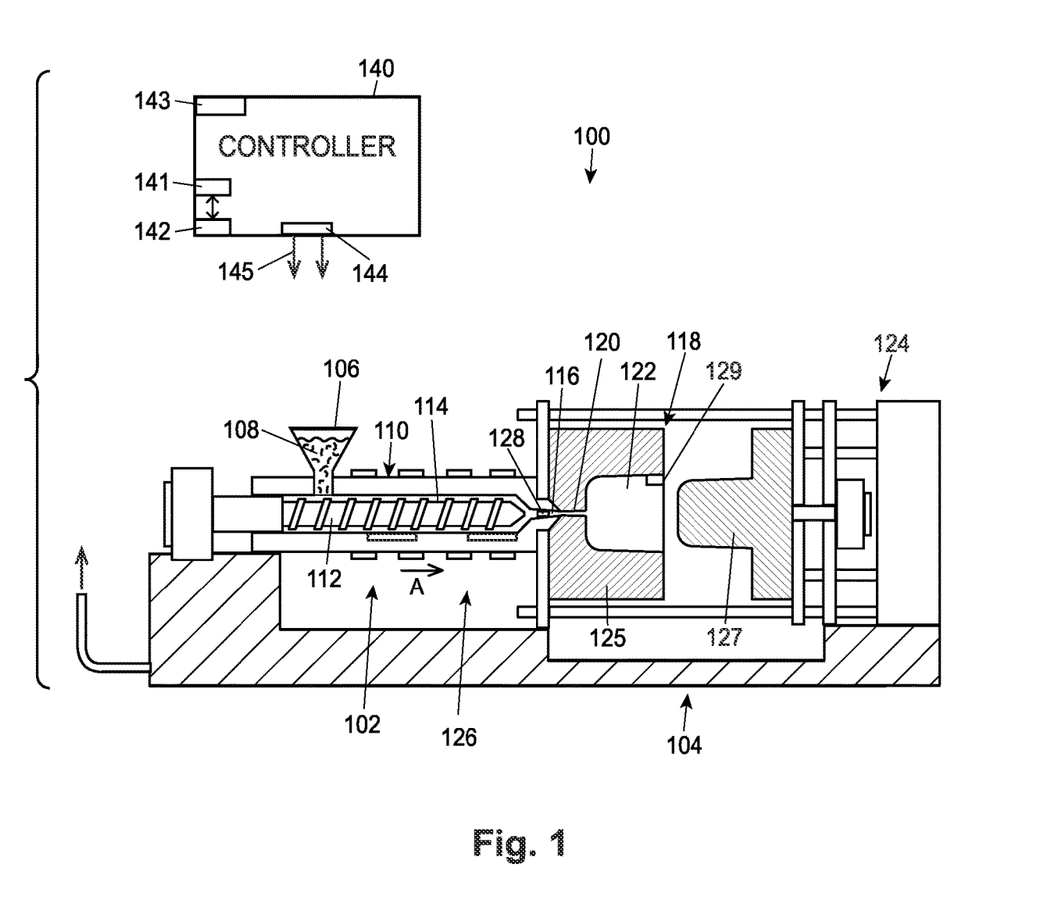
FIG. 1 illustrates a schematic view of an example first injection molding machine having a controller coupled thereto in accordance with various embodiments of the present disclosure.
Figure 7:
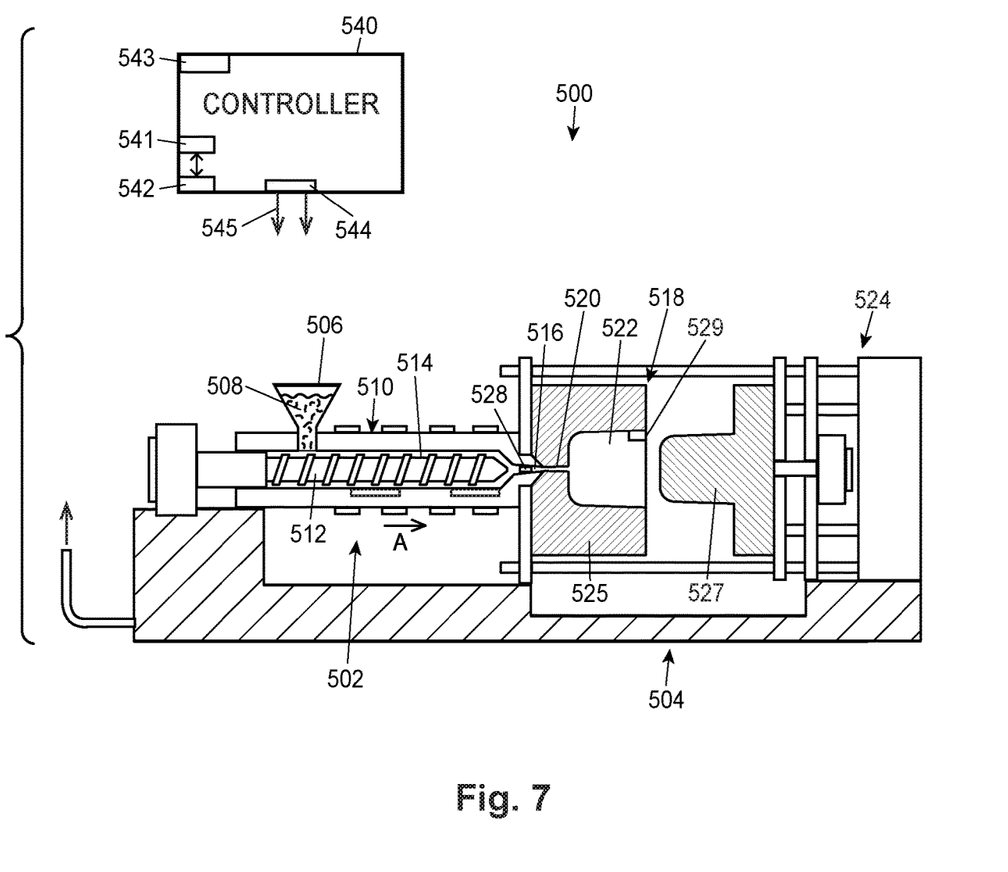
FIG. 7 illustrates a schematic view of an example second injection molding machine having a controller coupled thereto in accordance with various embodiments of the present disclosure.

Turning to the drawings, an injection molding process is herein described. The approaches described herein may be suitable for electric presses, servo-hydraulic presses, hydraulic presses, and other known machines. As illustrated in FIG. 1, a first injection molding machine 100 includes an injection unit 102 and a clamping system 104. The injection unit 102 includes a hopper 106 adapted to accept material in the form of pellets 108 or any other suitable form. In many of these examples, the pellets 108 may be a polymer or polymer-based material. Other examples are possible. It will be appreciated that the second injection molding machine 500 illustrated in FIG. 7 may include similar features to the machine 100, and thereby elements illustrated in FIG. 7 are designated by similar reference numbers indicated on the embodiment illustrated in FIG. 1, increased by 400. Accordingly, these features will not be described in substantial detail.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range of about 130° C. to about 410° C.

The reciprocating screw 112 advances forward and forces the molten plastic material 114 toward a nozzle 116 to form a shot of plastic material that will ultimately be injected into a mold cavity 122 of a mold 118 via one or more gates 120 which direct the flow of the molten plastic material 114 to the mold cavity 122. In other words, the reciprocating screw 112 is driven to exert a force on the molten plastic material 114. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components, such as a tie bar.

Once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 115, 117, which are then separated from one another. The finished part may then be ejected from the mold 118. The mold 118 may include any number of mold cavities 122 to increase overall production rates. The shapes and/or designs of the cavities may be identical, similar, and/or different from each other. For instance, a family mold may include cavities of related component parts intended to mate or otherwise operate with one another.

The injection molding machine 100 also includes a controller 140 communicatively coupled with the machine 100 via connection 145. The connection 145 may be any type of wired and/or wireless communications protocol adapted to transmit and/or receive electronic signals. In these examples, the controller 140 is in signal communication with at least one sensor, such as, for example, sensor 128 located in or near the nozzle 116 and/or a sensor 129 located in or near the mold cavity 122. In some examples, the sensor 129 is located in a manifold or a runner of the injection machine 100. It is understood that any number of additional sensors capable of sensing any number of characteristics of the mold 118 and/or the machine 100 may be used and placed at desired locations of the machine 100. As a further example, any type of sensor capable of detecting flow front progression in the mold cavity 122 may be used.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The sensor 128 may be any type of sensor adapted to measure (either directly or indirectly) one or more characteristics of the molten plastic material 114. The sensor 128 may measure any characteristics of the molten plastic material 114 that are known and used in the art, such as, for example, pressure, temperature, viscosity, flow rate, hardness, strain, optical characteristics such as translucency, color, light refraction, and/or light reflection, and the like, or any one or more of any number of additional characteristics which are indicative of these. The sensor 128 may or may not be in direct contact with the molten plastic material 114. In some examples, the sensor 128 may be adapted to measure any number of characteristics of the injection molding machine 100 and not just those characteristics pertaining to the molten plastic material 114. As an example, the sensor 128 may be a pressure transducer that measures a melt pressure of the molten plastic material 114 at the nozzle 116.

The sensor 128 generates a signal which is transmitted to an input of the controller 140. If the sensor 128 is not located within the nozzle 116, the controller 140 can be set, configured, and/or programmed with logic, commands, and/or executable program instructions to provide appropriate correction factors to estimate or calculate values for the measured characteristic in the nozzle 116.

Similarly, the sensor 129 may be any type of sensor adapted to measure (either directly or indirectly) one or more characteristics of the molten plastic material 114 to detect its presence and/or condition in the mold cavity 122. In various embodiments, the sensor 129 may be located at or near an end-of-fill position in the mold cavity 122. The sensor 129 may measure any number of characteristics of the molten plastic material 114 and/or the mold cavity 122 that are known in the art, such as, for example, pressure, temperature, viscosity, flow rate, hardness, strain, optical characteristics such as translucency, color, light refraction, and/or light reflection, and the like, or any one or more of any number of additional characteristics which are indicative of these. The sensor 129 may or may not be in direct contact with the molten plastic material 114. As an example, the sensor 129 may be a pressure transducer that measures a cavity pressure of the molten plastic material 114 within the cavity 122. The sensor 129 generates a signal which is transmitted to an input of the controller 140. Any number of additional sensors may be used to sense and/or measure operating parameters.

The controller 140 is also in signal communication with a screw control 126. In some embodiments, the controller 140 generates a signal which is transmitted from an output of the controller 140 to the screw control 126. The controller 140 can control any number of characteristics of the machine, such as, for example, injection pressures (by controlling the screw control 126 to advance the screw 112 at a rate which maintains a desired value corresponding to the molten plastic material 114 in the nozzle 116), barrel temperatures, clamp closing and/or opening speeds, cooling time, inject forward time, overall cycle time, pressure set points, ejection time, screw recovery speed, and screw velocity. Other examples are possible.

The signal or signals from the controller 140 may generally be used to control operation of the molding process such that variations in material viscosity, mold temperatures, melt temperatures, and other variations influencing filling rate are taken into account by the controller 140. Adjustments may be made by the controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The controller 140 may be connected to the sensors 128, 129, the screw control 126, and or any other components in the machine 100 via any type of signal communication approach known in the art.

The controller 140 includes software 141 adapted to control its operation, any number of hardware elements 142 (such as, for example, a non-transitory memory module and/or processors), any number of inputs 143, any number of outputs 144, and any number of connections 145. The software 141 may be loaded directly onto a non-transitory memory module of the controller 140 in the form of a non-transitory computer readable medium, or may alternatively be located remotely from the controller 140 and be in communication with the controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

In some examples, the controller 140 may be in the form of a first and a second controller, each of which has similar features as those in the controller 140. In these examples, the first controller may control a first portion of the injection cycle, and the second controller may control a second portion of the injection cycle.

Figure 2:
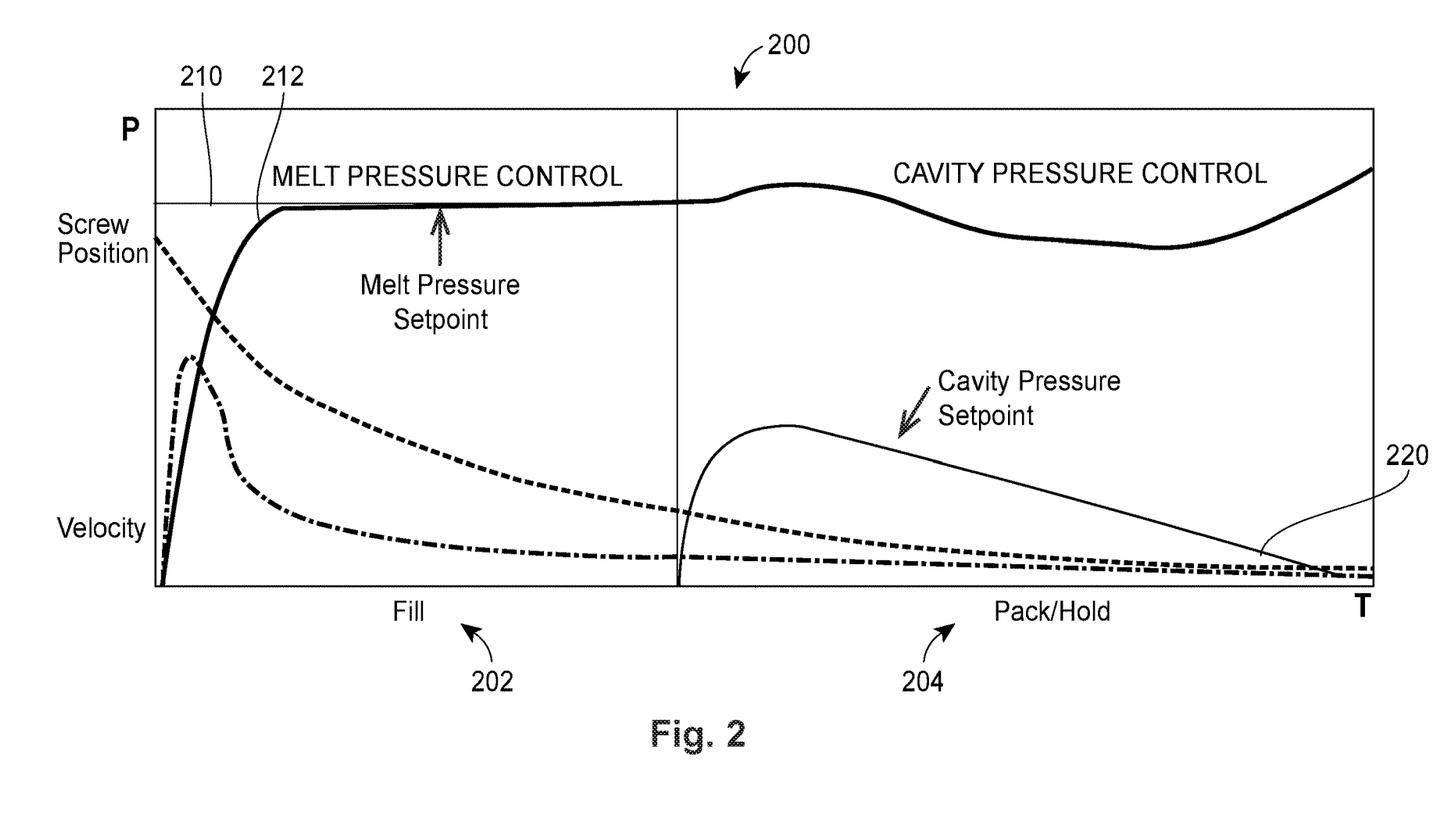
FIG. 2 illustrates an example injection profile for an injection molding cycle in accordance with various embodiments of the present disclosure.

As illustrated in FIG. 2, an example injection profile 200 of a conventional injection molding cycle includes a number of distinct stages. While the illustrated example depicts a substantially constant pressure profile, other pressure profiles (e.g., a velocity controlled, high pressure injection molding process) may be used in conjunction with the approaches described herein. In the illustrated example, the sensors 128, 129 are any type of pressure sensors (e.g., gauge pressure sensors, differential pressure sensors, force collector type sensors such as piezo resistive strain gauges, capacitive sensors, resonant sensors, thermal sensors, and/or electromagnetic sensors), and are disposed at the nozzle 116 and at a location inside, near the inside, or on the outer wall of the mold 118. Specifically, the sensor 128 may be a nozzle transducer that senses a melt pressure of the injection machine, and the sensor 129 may be a cavity pressure transducer that senses a cavity pressure of the injection machine.

In the illustrated example, an operational pattern in the form of an ideal melt pressure profile or setpoint 210 is identified and used as an input to control operation of the injection molding machine 100. In other words, in this example, the melt pressure setpoint 210 is used as the input which determines how the machine 100 should operate, while the sensor 128 provides feedback to the controller 140 to determine whether adjustments should be made to the injection cycle to match the melt pressure setpoint 210. As illustrated in FIG. 2, a melt pressure curve 212 reflects the melt pressure measured by the sensor 128. Accordingly, the controller 140 may adjust the pressure exerted on the screw 112 in order to maintain the melt pressure curve 212 to the melt pressure setpoint 210. Depending on the type of machine 100 being used, different valves and/or motors may be used to maintain and/or adjust the pressure exerted on the back of the screw 112. For example, a servo motor may be used to turn the screw drive and control movement of the screw 112, a flow control valve may be used, which controls the quantity of hydraulic fluid being exerted on the screw 112, or a proportional valve may be used.

During a first stage 202, the molten plastic material 114 first fills the mold cavity 122. In this stage 202, the controller 140 increases the melt pressure to a substantially constant pressure value (e.g., approximately 10,000 psi) and then causes the melt pressure to hold at or close to this pressure value while the molten plastic material 114 fills the mold cavity 122. The molten plastic material 114 then enters a pack/hold stage 204 where the melt pressure is maintained to ensure that all gaps in the mold cavity 122 are back filled. In these systems, the mold cavity 122 is filled from the end of the flow channel back towards the gate 120. As a result, molten plastic material 114 in various stages of solidification is packed upon itself. In these approaches, the melt pressure is either raised or lowered based on the amount of cavity pressure measured. The degree of change is dependent on the amount of cavity pressure and a multiplier, as will be discussed below, which are determined during process validation and adjusted as needed.

During this process, upon the mold cavity 122 being substantially and/or completely filled with molten plastic material 114, the pressure, measured by the sensor 129, within the mold cavity 122 will eventually become a non-zero value. The time it takes for the injection cycle to reach a non-zero cavity pressure can be defined as a "step time", which is equal to the time required to fill the mold cavity 122 (e.g., a "fill time") plus a process factor adjustment ("PFA") value. PFA is a multiplier to the amount of cavity pressure measured in the mold. As cavity pressure is measured, an adjustment to the Melt Pressure setpoint takes place based on a multiplier that is determined during the validation of the process (PFA). This multiplier can be adjusted as necessary to make a quality part. In the illustrated example of FIG. 2, the overall step time corresponds to the duration of stage 202, and therefore is intended to remain a fixed value. However, as will be discussed, in practice, the actual step time for each injection cycle may vary depending on material characteristics.

As illustrated by curve 220 in FIG. 2, which depicts a cavity pressure sensed by sensor 129, during the injection cycle and upon the cavity being substantially completely filled, the cavity pressure rapidly increases to a maximum value, and subsequently decreases until it returns to a minimal value as the injection cycle is completed. In conventional injection systems, the cavity pressure curve 220 is merely an output of the injection system which may be used to provide data representative of the quality of the injection cycle. As previously noted, during a validation stage, a number of varying injection cycles are performed until a molded part having ideal and/or desirable characteristics is obtained. This ideal injection cycle will produce as an output a corresponding ideal pattern that is at least partially based on the fill time, fill pressure, and material characteristics. Accordingly, once it is determined that a suitable injection cycle has been performed that produces parts having suitable physical characteristics, the resulting cavity pressure curve, such as illustrated cavity pressure curve 220 may be one example of an ideal pattern obtained during the injection cycle that is used in subsequent injection molding processes.

The example injection profile 200 illustrated in FIG. 2 does not account for changes in material properties; rather, the injection profile 200 is driven by controlling the system to match the previously-identified melt pressure control setpoint 210. Thus, when changes to the material and/or environment invariably occur, the controller 140 continues to control the injection cycle in a manner that adheres to the fixed melt pressure setpoint 210 (as opposed to, for example, adhering to a specified screw velocity). In other words, the controller 140 will continue to cause the same pressure to be exerted on the screw 112 regardless of whether the molten plastic material 114 is more or less viscous and/or has other varying material characteristics. Accordingly, the screw velocity and the step time become outputs of the system 100. If the molten plastic material 114 has different material characteristics in these subsequent injection cycles, the injection profile will result in a varying step time and the mold cavity will either be over or under filled. In other words, while the injection profile 200 intends for the actual step time to match the previously-identified step time, the actual step time for the particular fill portion of the cycle may be shorter or longer than the previously observed step time value. Either of these conditions will negatively impact the quality of the molded part. Either of these conditions will negatively impact the quality of the molded part. Although the fill stage 202 may not compensate for varying material melt characteristics, this compensation is performed in the pack/hold 204 stage of the process, using cavity pressure control. As seen in the pack/hold stage of the illustration, nozzle sensed melt pressure 212 becomes an output of the system, while cavity sensed melt pressure 220, is controlled to a setpoint.

Figure 3:
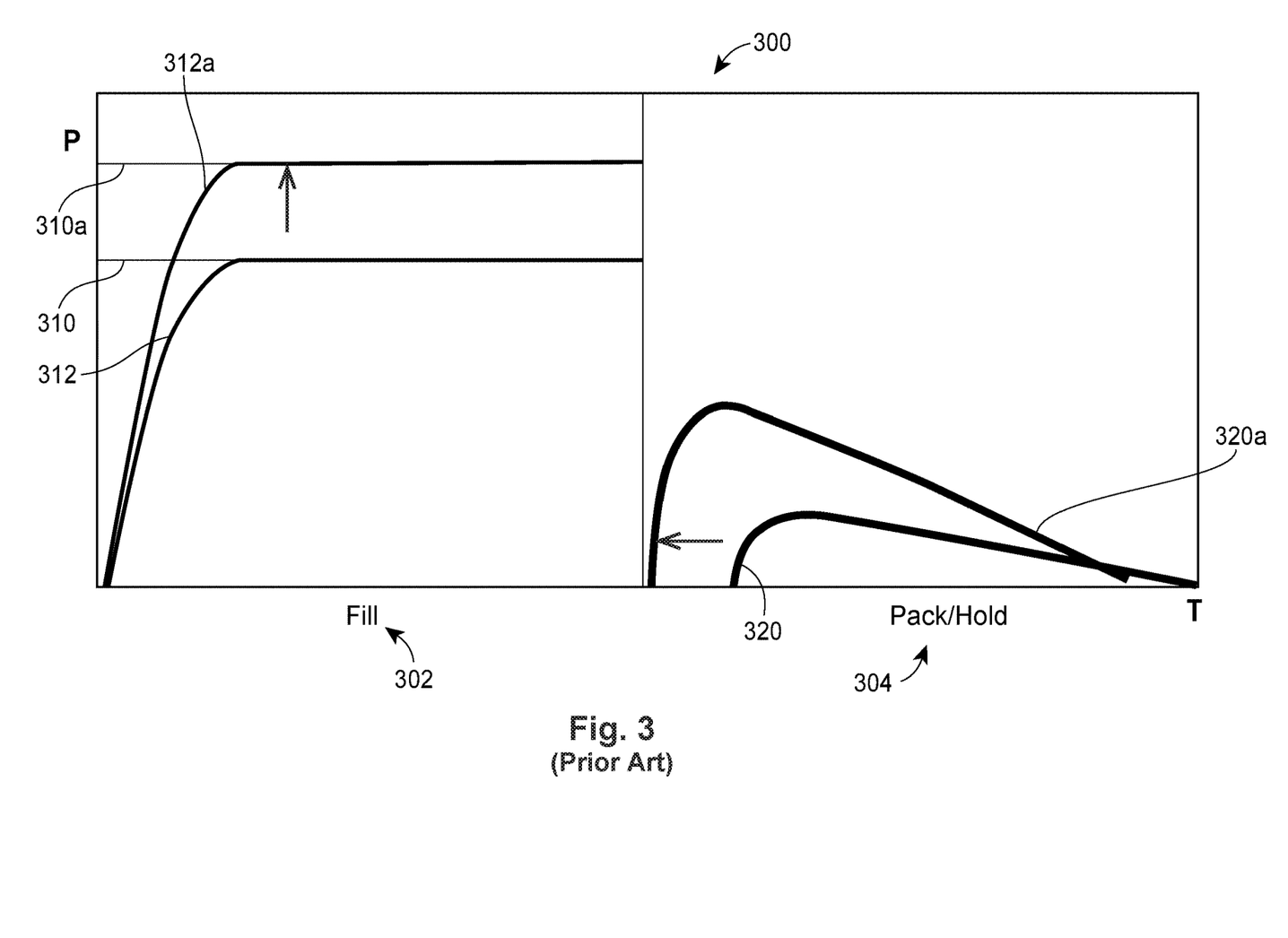
FIG. 3 illustrates a first example of a prior art injection profile for an injection molding cycle whereby a melt pressure setpoint is adjusted to account for changing material characteristics
Figure 4:
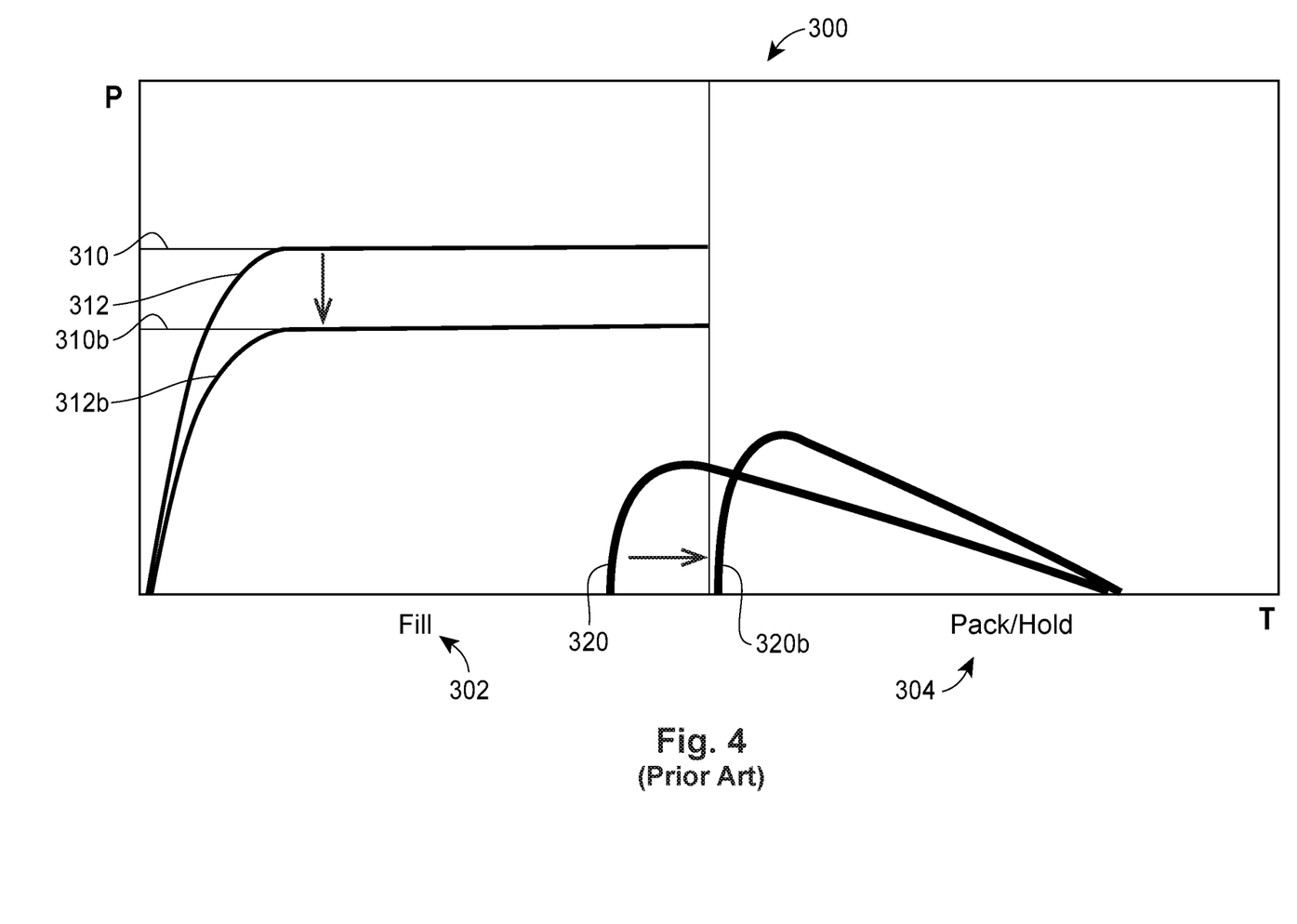
FIG. 4 illustrates a second example of a prior art injection profile for an injection molding cycle.

To overcome the presence of varying material and/or environmental changes in the system, injection profiles that adjust the injection cycle have previously been employed, an example of which is depicted in the injection profile 300 of FIGS. 3 and 4. In the injection profile 300, the melt pressure setpoint 310 is adjustable as needed to cause the overall step time to remain constant (i.e., to remain equal to the step time obtained from the original/ideal injection cycle). In addition to the overall step time remaining constant, in these examples, the ratio between the fill time and PFA time is also constant, thereby ensuring that in the event the viscosity shifts, the entire mold cavity 122 will always be filled, thereby avoiding flashing. In these examples, a constant shear rate is maintained on the molten plastic material 114.

As illustrated in FIGS. 3 and 4, during the injection profile 300, the controller 140 monitors the melt pressure 312 via the sensor 128 to maintain the same step time or fill rate. Accordingly, as the viscosity shifts, the melt pressure control compensates and adjusts the melt pressure setpoint 310. For example, as illustrated in FIG. 3, when the viscosity of the molten plastic material 114 increases, the melt pressure profile 310 shifts to an alternate melt pressure profile 310a that operates at a higher melt pressure in order to maintain the same amount of shear on the molten plastic material 114. Accordingly, the sensed melt pressure depicted by the melt pressure curve 312a is higher than the original melt pressure curve 312. Similarly, as illustrated in FIG. 4, when the viscosity of the molten plastic material 114 decreases, the melt pressure profile 310 shifts to an alternate melt pressure profile 310b that operates at a lower melt pressure in order to maintain the same amount of shear on the molten plastic material 114. Accordingly, the sensed melt pressure depicted by the melt pressure curve 312b is lower than the original melt pressure curve 312. Additional details of approaches for automatic viscosity adjustment are described in U.S. Provisional Appl. No. 62/665,866, filed May 2, 2018, and U.S. Provisional Appl. No. 62/568,548, filed Oct. 5, 2017, the entirety of which are hereby incorporated by reference.

While the injection profile 300 allows for adjustments to be made to account for changes in the environment and/or characteristics of the molten plastic material 114, the melt pressure is still used as the determining factor to drive the injection cycle. In this profile 300, after a cavity pressure is measured, the melt pressure may increase or decrease depending on PFA, but will generally level out and remain constant. The pressure at which it levels off is determined by the peak cavity pressure as well as the multiplier of PFA. As illustrated in FIGS. 3 and 4, when using the alternate melt pressure profiles 310a, 310b, the resulting pattern (i.e., the cavity pressure curves 320a, 320b, respectively) are merely an output of the injection profile 300. Each of the cavity pressure curves 320a, 320b have significant variances in peak cavity pressure values and area under the curves 320a, 30b from the previously determined ideal cavity pressure curve 320. Because the shape of the cavity pressure curves 320a, 320b is not identical as changes to the melt pressure control are made, the resulting parts may not retain all dimensional tolerances and thus may have undesirable structural and/or other characteristics. The slight discrepancies between the curves may appear to be insignificant, but the resulting parts may be of substantially inferior quality, and may include aesthetic and/or structural faults. Thus, while the injection profile 300 allows for adjustments without changing the overall process (i.e., by adjusting the melt pressure to keep the time to a nominal, measured cavity pressure consistent), this process typically is not used on parts having critical dimensions.

Figure 5:
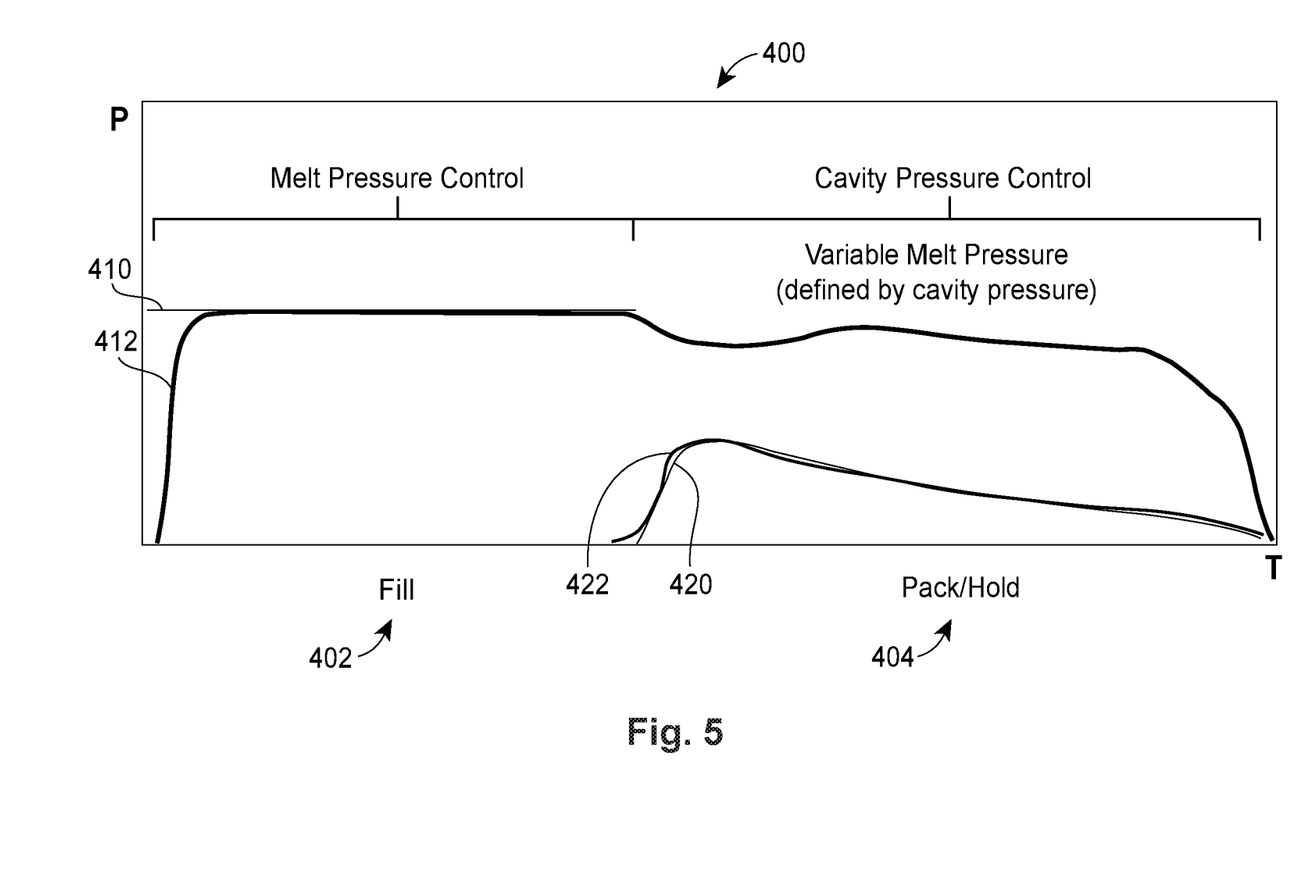
FIG. 5 illustrates a first example injection profile for an injection molding cycle utilizing pattern recognition control in accordance with various embodiments of the present disclosure.
Figure 6:
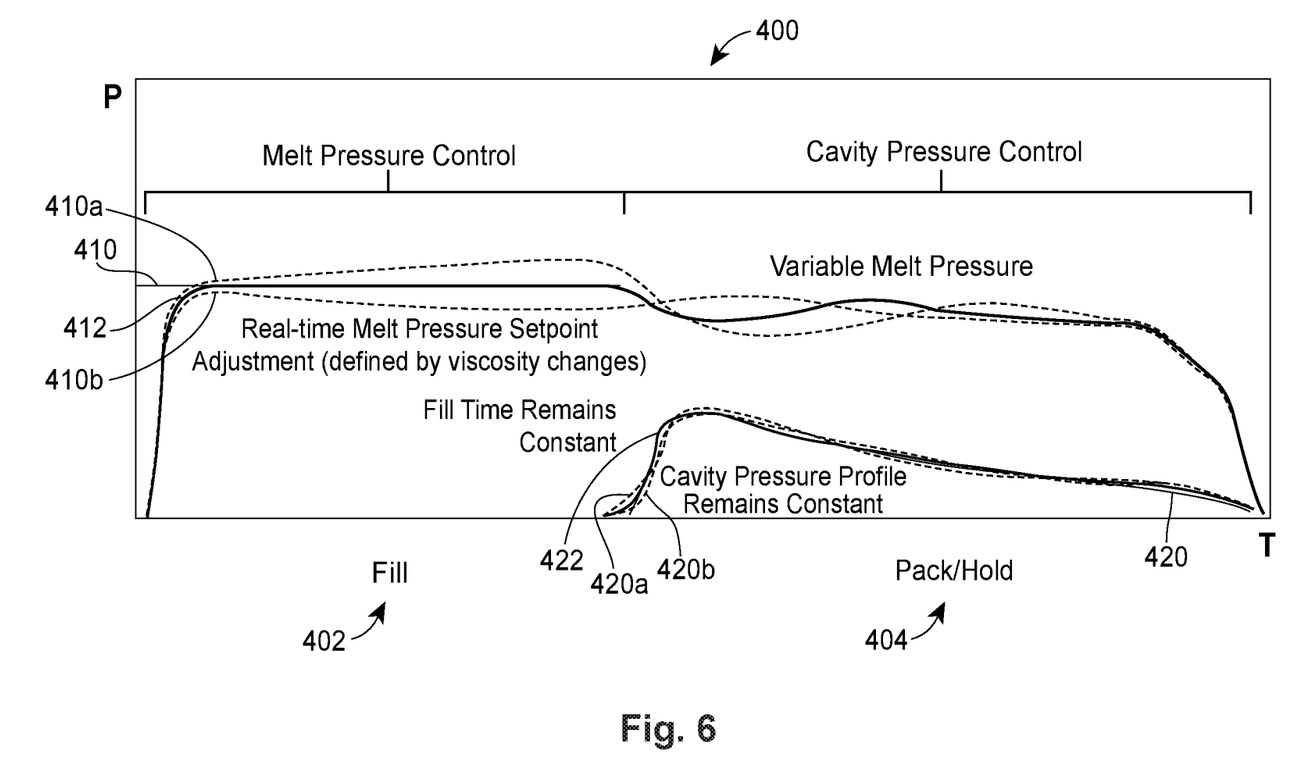
FIG. 6 illustrates a second example injection profile for an injection molding cycle utilizing pattern recognition control in accordance with various embodiments of the present disclosure.

Accordingly, and as illustrated in FIGS. 5 and 6, systems and approaches of the present disclosure use measurements from the sensor 129 as an input to the injection profile 400. As previously noted, the sensor 129 may be a transducer that senses changes to the cavity pressure, whereupon it may send an electrical charge that is converted to a calibrated voltage signal that the controller 140 interprets to identify a cavity pressure value.

As also previously noted, during the validation stage, an ideal pattern may be obtained upon determining an ideal injection pattern that generates molded parts having suitable qualities. One example of a pattern may be an ideal cavity pressure profile or setpoint 420. In the injection profile 400, the injection molding machine 100 is operated as before to inject the molten plastic material 114 into the mold cavity 122. The injection cycle continues until an event, such as the detection of a nominal cavity pressure, occurs. For example, during the injection phase, the cavity pressure is continuously observed until a nominal cavity pressure value (e.g., approximately 50 psi) is measured. This nominal value is decided during setup of the optimal injection cycle, and is preferably a value that is substantial enough to be an indicator of an actual increase in cavity pressure and not a gas bubble or other discrepancy within the part.

Upon measuring a nominal cavity pressure value, the controller 140 commences a pattern recognition portion of the injection cycle (such as, for example, a cavity pressure control portion). In this pattern recognition portion, the driving force exerted by the screw 112 is adjusted such that the measured cavity pressure 422 matches the previously obtained ideal pattern (e.g., the ideal cavity pressure profile 420). In other words, the cavity pressure measured by the sensor 129 becomes an input to the injection profile 400, and the controller 140 adjusts the pressure exerted on the screw 112 so the measured cavity pressure 422 matches the cavity pressure profile 420. By ensuring the measured cavity pressure 422 matches the previously identified ideal cavity pressure profile 420, the machine 100 will consistently make the same part having identical physical and structural characteristics.

In other words, as the viscosity, melt density, and/or other characteristics of the molten plastic material 114 shift, compensation in the injection profile 400 is required both during and after the filling stage 402 to maintain the same molded part. In the first stage, a melt pressure control profile or setpoint 410 is used to apply the optimal amount of pressure on the molten plastic material 114, which is monitored and sensed via sensor 128 located at or near the nozzle 116 and as depicted by the line 412 in FIGS. 5 & 6. In the hold stage 404, the cavity pressure control profile 420 is used to apply the optimal amount of pressure on the material within the mold, which is monitored and sensed via sensor 129 located at or near the mold cavity 122.

As depicted in FIG. 6, as these variations to the molten plastic material 114 occur, the controller 140 calculates adjustments in real or near-real time that are required to maintain the melt pressure and cavity pressure profiles. During the fill stage 402, when the controller 140 recognizes changes to the characteristics of the molten plastic material 114, the melt pressure setpoint 410 is adjusted to adjusted melt pressure setpoints (depicted by dotted lines 410a and 410b) as needed to ensure that the cycle will reach a nominal cavity pressure at the same time as in the ideal injection profile. Similarly, in the hold stage 404, a force exerted on the screw 112 (and/or its movement) is adjusted in real or near-real time in response to deviations in the cavity pressure profile (depicted by dotted lines 420a, 420b) to ensure the sensed pressure curve 422 matches the cavity pressure setpoint 420.

In some examples, and as previously noted, the controller 140 ensures the measured cavity pressure matches the previously identified ideal cavity pressure profile 420, however in other examples, the controller may ensure the measured cavity pressure is within a specified range (e.g., one standard deviation) of the previously identified ideal cavity pressure profile 420. In other words, the injection profile 400 closes the loop within a certain range. For example, the controller 140 may set an upper and/or a lower limit on acceptable peak cavity pressure values when compared to a peak cavity pressure value taken from the previously identified ideal cavity pressure profile 420. Additionally or separately, the controller 140 may set an upper and/or a lower limit on acceptable integral (i.e., the area below the cavity pressure curve) values when compared to an integral value derived from the previously identified ideal cavity pressure profile 420. In one example, the upper and lower limits of the measured values (i.e., the peak cavity pressure and integral values) may be within approximately 5% of the values derived from the previously identified ideal cavity pressure profile 420. Other examples of suitable limits are possible.

It is understood that in the injection profile 400, before the sensor 129 measures a nominal cavity pressure value, any type of control profile may be used. For example, during the first stage 402 of the injection profile 400, the controller may control the injection profile 400 in a similar manner to: a) the first stage 202 of injection profile 200 (i.e., using a fixed melt pressure setpoint value); b) the first stage 302 of injection profile 300 (i.e., using a variable melt pressure setpoint value); and/or c) using any other control profile. However, in the illustrated example of FIGS. 5 and 6, a variable melt pressure control profile is used.

As previously noted, in the injection profile 400, the controller 140 switches from a melt pressure control profile to the cavity pressure control profile 420 automatically. It is understood that this transition may occur based on the occurrence of any number of different events such as sudden changes or specific values in one or more of the signals being sensed by the system. Further, in some examples, the controller 140 may incorporate machine learning techniques to automatically identify appropriate conditions for switching to the cavity pressure profile 420.

In some of these examples, the controller 140 may be in the form of two separate or distinct controllers whereby a first controller is responsible for controlling the melt pressure profile, and a second controller is responsible for controlling the cavity pressure profile 420. In these examples, the first controller controls the melt pressure profile by generating an output voltage received by the screw control 126. At the same time, the second controller may mirror the output voltage generated by the first controller, but this output voltage is not sent to the screw control 126. Upon the operation of the pattern recognition portion of the injection cycle commencing, a "switch-over" occurs whereby the output voltage of the second controller is sent to the screw control 126 and the cavity pressure profile 420 is used to at least partially control operation of the injection cycle. Accordingly, the transition from the melt pressure control to the cavity pressure control is seamless and the screw control 126 receives an uninterrupted control signal.

With reference to FIG. 7, all or a portion of the injection profile 400 may be replicated by the controller 540 to control operation of the second injection machine 500. Specifically, the ideal cavity pressure profile 420 may be implemented such that upon an event occurring (e.g., the detection of a nominal cavity pressure value by the sensor 529), the controller may commence a pattern recognition portion of the injection cycle (such as, for example, the cavity pressure control portion). As previously noted, the second injection molding machine 500 may include similar features to the machine 100, and thereby elements illustrated in FIG. 7 are designated by similar reference numbers indicated on the embodiment illustrated in FIG. 1, increased by 400, For example, the machine 500 includes an injection unit 502, a clamping system 504, a hopper 506, pellets 508, a heated barrel 510, a molten plastic material 514, a nozzle 516, a mold 518, one or more gates 520, a press or clamping unit 524, a first mold side 525, a second mold side 527, a sensor 528, software 541, hardware 542, inputs 543, outputs 544, and a connection 545. Accordingly, these features will not be described in substantial detail.

As with the machine 100, in this pattern recognition portion, the driving force exerted by the screw 512 is adjusted such that the measured cavity pressure (422, FIG. 5) matches the previously obtained ideal pattern (e.g., the ideal cavity pressure profile 420 of FIG. 5). As used herein, an "ideal pattern" means an obtainable, desirable pattern that reliably results in a part that is reasonably free of defects. In other words, the cavity pressure measured by the sensor 529 becomes an input to the injection profile 400, and the controller 540 adjusts the pressure exerted on the screw 512 so the measured cavity pressure 422 matches the cavity pressure profile 420. By ensuring the measured cavity pressure 422 matches the previously identified ideal cavity pressure profile 420 derived from the first injection molding machine 100, the second injection molding machine 500 will consistently make the same part having identical physical and structural characteristics.

The second injection molding machine 500 may have any number of distinct characteristics from the first injection molding machine 100. For example, the second injection molding machine may have more mold cavities 522 (e.g., 196 cavities in a production-ready device), and thus can be used during commercial production of the molded part. Other examples include, but are not limited to: machine size/tonnage, machine control type (electric, hydraulic, etc.), age of the machine, environmental condition of the machine's location(s), barrel size, and/or screw size/type.

In some examples, the injection profile 400 may be developed for parts having a specific resin makeup that may have a number of derivative makeups. For example, the injection profile 400 may be derived for a polypropylene (PP) material having ten different sub-classifications. The injection profile 400 may be used for any of these sub-classifications, thereby increasing the overall number of available materials that can be purchased from suppliers to improve the user's supply purchasing power.

In some examples, the sensor 129 may be disposed remotely from the mold cavity 122, yet may still be in communication therewith. For example, U.S. application Ser. No. 15/216,762, filed Jul. 22, 2016, the entirety of which is hereby incorporated by reference, describes the use of one or more external sensors as a virtual cavity sensor. Such a sensor or sensor arrangement may be used interchangeably with the sensor 129 described herein.

The above-described approaches may be used in conjunction with any injection process where the previously-identified pattern is used to drive at least a portion of the injection cycle. These approaches may be used in the formation of any number of different molded parts constructed from a variety of materials such as, for example silicone and metal parts. As an example, in a conventional (i.e., a high-pressure process) injection molding system, the controller may be set to operate according to the ideal pattern (e.g., the cavity pressure curve) in a similar manner. Additionally or alternatively, in examples where a control gate sensor is used, the ramping portion of the injection process may also be controlled.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for controlling an injection molding machine having a first configuration and a mold forming a mold cavity, the injection molding machine being controlled according to an injection cycle, the method comprising:

obtaining a pattern for at least a portion of an injection cycle of an injection molding machine having a second configuration, obtaining the pattern comprising obtaining a cavity pressure setpoint curve for the injection cycle of the injection molding machine having the second configuration;

operating the injection molding machine having the first configuration according to the injection cycle to inject a molten material into the mold cavity;

while operating the injection molding machine having the first configuration, using the obtained pattern to control a portion of the injection cycle;

wherein operating the injection molding machine having the first configuration comprises:

during a first, injection portion of the injection cycle, adjusting a driving force being exerted on the molten material according to a melt pressure control-based input;

measuring a cavity pressure value of the mold cavity during the mold cycle;

upon measuring a nominal cavity pressure value indicative of an actual increase in cavity pressure, commencing a second, pattern recognition portion of the injection cycle that is at least partially dependent on the obtained pattern, where the driving force being exerted on the molten material is adjusted such that the measured cavity pressure matches the obtained pattern for the injection cycle;

wherein during the injection portion of the injection cycle, a melt pressure setpoint is adjusted to ensure the nominal cavity pressure value is measured at a predetermined ideal time.

2. The method of claim 1, wherein the injection molding machine having the first configuration includes a first number of mold cavities, and wherein the injection molding machine having the second configuration includes a second number of mold cavities that is different than the first number of mold cavities.

3. The method of claim 1, wherein the injection molding machine having the first configuration comprises a first injection molding machine, and wherein the injection molding machine having the second configuration comprises a second injection molding machine.

4. The method of claim 1, wherein the injection molding machine having the second configuration comprises a pilot tooling.

5. The method of claim 1, wherein the obtained pattern is indicative of an optimal pressure trace for a particular mold.

6. The method of claim 1, wherein a driving force being exerted on the molten material is exerted by at least one of a press, a servo motor, or a flow control valve.

* * * * *